(12) United States Patent
Bestgen et al.

(10) Patent No.: US 9,411,861 B2
(45) Date of Patent: Aug. 9, 2016

(54) MULTIPLE RESULT SETS GENERATED FROM SINGLE PASS THROUGH A DATASPACE

(75) Inventors: Robert Joseph Bestgen, Rochester, MN (US); David Glenn Carlson, Rochester, MN (US); Robert Victor Downer, Rochester, MN (US); Shantan Kethireddy, Rolling Meadows, IL (US)

(73) Assignee: International Business Machines Corporation, Armonk, NY (US)

( * ) Notice: Subject to any disclaimer, the term of this patent is extended or adjusted under 35 U.S.C. 154(b) by 2595 days.

(21) Appl. No.: 11/962,980

(22) Filed: Dec. 21, 2007

(65) Prior Publication Data
US 2009/0164412 A1 Jun. 25, 2009

(51) Int. Cl.
*G06F 17/30* (2006.01)

(52) U.S. Cl.
CPC .............................. *G06F 17/30545* (2013.01)

(58) Field of Classification Search
USPC .................... 707/714, 999.004, 736, 747, 770
See application file for complete search history.

(56) References Cited

U.S. PATENT DOCUMENTS

| | | | | |
|---|---|---|---|---|
| 5,515,488 A | * | 5/1996 | Hoppe et al. | 345/440 |
| 5,535,385 A | * | 7/1996 | Griffin et al. | |
| 5,590,319 A | * | 12/1996 | Cohen et al. | |
| 5,749,079 A | * | 5/1998 | Yong et al. | |
| 6,507,840 B1 | * | 1/2003 | Ioannidis et al. | |
| 6,915,291 B2 | | 7/2005 | Carlson et al. | |
| 6,947,927 B2 | * | 9/2005 | Chaudhuri et al. | |
| 7,555,493 B2 | * | 6/2009 | Khayter et al. | |
| 7,725,455 B1 | * | 5/2010 | Shatdal | 707/713 |
| 2003/0023620 A1 | * | 1/2003 | Trotta | 707/203 |
| 2004/0210562 A1 | * | 10/2004 | Lee et al. | 707/3 |
| 2005/0198074 A1 | * | 9/2005 | Khayter et al. | 707/104.1 |
| 2006/0069717 A1 | * | 3/2006 | Mamou et al. | 709/203 |
| 2006/0288045 A1 | * | 12/2006 | Raz | 707/200 |

\* cited by examiner

*Primary Examiner* — Scott A Waldron
*Assistant Examiner* — Soheila Davanlou
(74) *Attorney, Agent, or Firm* — Middleton Reutlinger

(57) ABSTRACT

A method, apparatus and program product are provided for performing a query of a database. A database query is received, which includes first and second operations respectively configured to generate first and second disjoint results sets from a dataspace. The database query is analyzed to identify a set of attributes from the dataspace that are used by at least one of the first and second operations in the database query. During execution of the database query, a plurality of records from the dataspace is iteratively processed in a single pass, including, for each of the plurality of records, processing such record by retrieving the plurality of attributes for such record from the dataspace and performing each of the first and second operations on the record using the retrieved attributes for such record to build the first and second disjoint results sets.

25 Claims, 4 Drawing Sheets

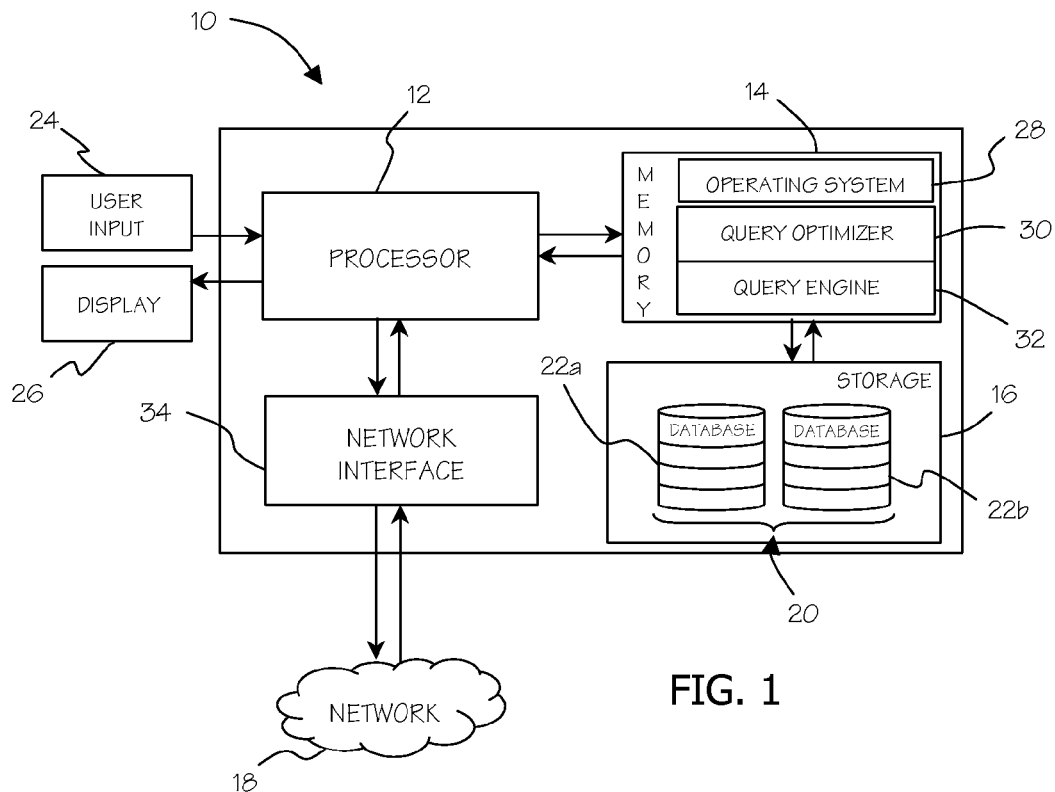
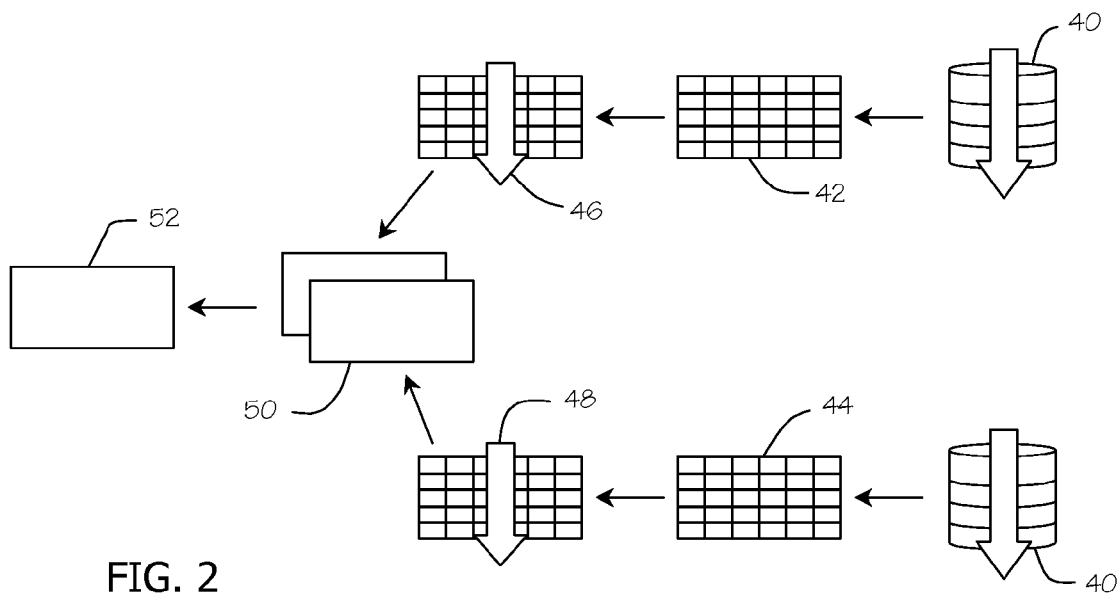
FIG. 1
FIG. 2

MULTIPLE RESULT SETS GENERATED FROM SINGLE PASS THROUGH A DATASPACE

FIELD OF THE INVENTION

The present invention relates to computers and data processing, and more particularly databases and database queries.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. As the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

Many conventional database management systems, for example, are inherently interpretive systems, where queries are written in an interpretive language such as SQL, and dynamically interpreted by a query engine during query execution. Runtime interpretation in a computer environment, however, almost always results in reduced performance as compared to direct execution of executable code. Other conventional database management systems have attempted to reduce the amount of interpretation required to execute a query, typically by generating queries that comprise assembled blocks of code, such that a query engine needs only to select and execute code blocks that correspond to particular query instructions.

In addition, many conventional database management systems incorporate query optimizers, which operate to optimize the performance of a query to be executed by a query engine. Such query optimizers often operate by selecting from among multiple "plans", or possible implementations of a query, so as to execute the query with the greatest efficiency.

As an example, in a relational database, data is stored in tables, where the rows, or entries, in the tables generally correspond to data records, and the columns generally correspond to the fields in each data record. Thus, for example, in a table, "empinf," that stores information about a company's employees, the table may include columns, or fields, representing first name, last name, location, salary, department, job identifier, etc., with each row representing each record in the table.

To perform a search of a table to locate records that match a particular criterion, a table can often be analyzed using either table scans or index probes. A table scan operates more or less by sequentially stepping through each record in a table to find matching records, while an index probe is keyed off of an index that is generated for the table. A table scan is typically more efficient when a large number of records match the criterion, while an index probe (which has additional overhead associated with generating the index) is typically more efficient when only a small number of records match the criterion.

Thus, using the above example, assuming a query was directed to finding all employees that had a salary below $50,000, assuming that most employees had a salary below that range, a table scan would typically be more efficient than an index probe. On the other hand, assuming a query was directed to finding all employees having a first name of "David", an index probe would typically be more efficient, as the overhead associated with indexing the records based upon first name would be offset by the ability to directly lookup the relatively few number of records that matched the criterion.

Query optimizers typically rely on statistics, developed over time, to select among multiple plans so that the most efficient plan for a particular type of query is selected. Therefore, a query optimizer in the aforementioned example might recognize that a query directed to the salary field typically generates a large number of matching records, and as such, a table scan-based plan would be the most appropriate for queries directed to the salary field. Likewise, such a query optimizer might recognize that a query directed to the first name field typically generates a small number of matching records, and as such, an index probe-based plan would be the most appropriate for queries directed to the first name field.

But even with using statistics and other optimization techniques, some query operations may still result in large overhead requirements. For example, SQL defines clauses such as "rollup", "cube", and "grouping sets" as shorthand notations for the union of multiple grouping/aggregations queries. Referring again to the example above, the following query:

SELECT jobid, dept, max(salary) FROM empinf GROUP BY GROUPING SETS(jobid,dept)

implicitly produces a "union all" of two disjoint result sets, one grouped by jobid, and the other by dept, from table empinf in the database.

An optimizer, when evaluating this query would likely rewrite the query similar to the following:

SELECT null( ),dept,max(salary) FROM empinf GROUP BY dept UNION ALL SELECT jobid,null( ),max(salary) FROM empinf GROUP BY jobid.

As can be seen from the above rewrite, the grouping/aggregation occurs sequentially, and the table empinf is accessed two times. Since the query text can be arbitrarily complex, with joins, and many tables, and the number of distinct grouping/aggregation values specified can be quite large, the overhead incurred by repeatedly executing the sub-query (in this case the scan of table empinf) can be large both in terms of cycles used as well as excessive I/O requirements. Even if the sub-query is materialized once, the temporary result from the scan of table empinf is still scanned twice to generate each distinct grouping/aggregation.

Therefore, there is a need in the art to be able to produce desired result sets from arbitrarily complex common sub-queries, such as above, with only a single pass through the dataspace, and without the need to store temporary, intermediate results.

SUMMARY OF THE INVENTION

Embodiments of the invention address these and other needs in the art by providing a method, apparatus and program product for performing a query of a database. A database query including first and second operations respectively configured to generate first and second disjoint results sets from a dataspace is received. The database query is analyzed to identify a set of attributes from the dataspace that are used by at least one of the first and second operations in the database query. During the execution of the database query, a plurality of records from the dataspace is iteratively processed in a single pass, including, for each of the plurality of records, processing such record by retrieving the plurality of attributes for such record from the dataspace and performing each of the first and second operations on the record using the retrieved attributes for such record to build the first and second disjoint results sets.

In some embodiments, analyzing the database query is accomplished by recognizing in the database query, by a query optimizer, the creation of first and second disjoint results sets from the common dataspace. A set of attributes is identified from the dataspace among the attributes that are used by at least one of the first and second operations in the database query. The first and second operations are defined to include the attributes relevant to the corresponding first and second operations. The database query is rewritten by the query optimizer to retrieve all of the attributes in a single pass through the common dataspace.

In some embodiments, the first and second operations include a production of a hash table, sorted list, index, relative record number list, relative record number bitmap, or unordered list. In some embodiments, each of the first and second operations is performed on the record using the retrieved attributes for the record to build the first and second disjoint results sets in a serial fashion. In other embodiments, each of the first and second operations is performed on the record using the retrieved attributes for the record to build the first and second disjoint results sets in a parallel fashion.

In some embodiments, the database query may include a third operation configured to generate a third disjoint results set from the dataspace. For these embodiments, the database query is analyzed to identify the set of attributes from the dataspace that are used by at least one of the first, second, and third operations in the database query. During the execution of the database query, the plurality of records from the dataspace is iteratively processed in a single pass, including, for each of the plurality of records, processing such record by retrieving the plurality of attributes for such record from the dataspace and performing each of the first, second, and third operations on the record using the retrieved attributes for such record to build the first, second, and third disjoint results sets.

Attributes in each of the embodiments may define columns in database tables in the dataspace. Some database queries may include user written queries. Some embodiments of the dataspace may include a plurality of related database tables common to the database query.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

FIG. 1 is a block diagram of an exemplary hardware and software environment for a computer suitable for implementing database query processing consistent with embodiments of the invention.

FIG. 2 is a block diagram showing a contemporary process of performing a database query by a conventional query optimizer and query engine.

DETAILED DESCRIPTION

Figure 3:
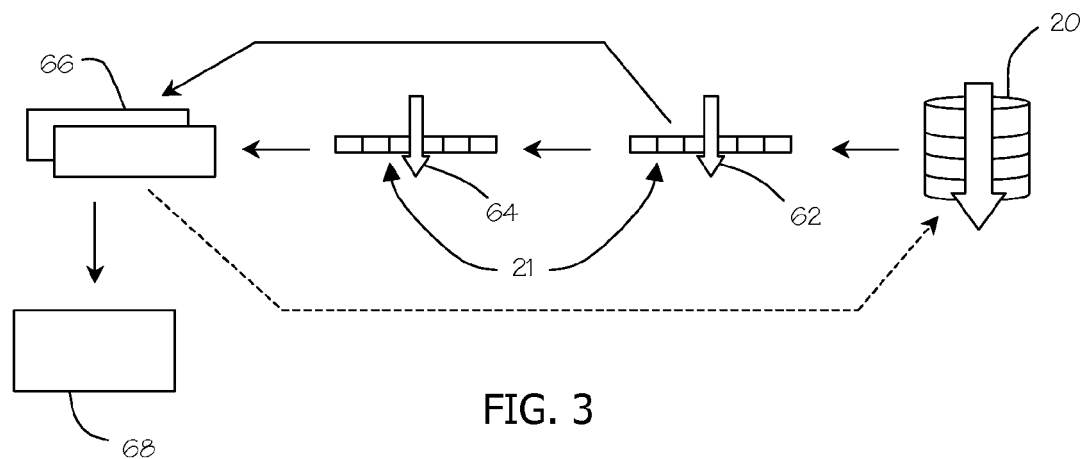
FIG. 3 is a block diagram showing one exemplary process of performing the database query of FIG. 2 in a manner consistent with the invention.

Embodiments of the invention address needs in the art by providing a method, apparatus and program product for performing a database query in a single pass through the database. The database query, including first and second operations respectively configured to generate first and second disjoint results sets from a dataspace, is received by, for example, a query optimizer. The database query is analyzed to identify a set of attributes from the dataspace that are used by at least one of the first and second operations in the database query. A plurality of records from the dataspace is iteratively processed in a single pass during the execution of the query, including, for each of the plurality of records, processing such record by retrieving the plurality of attributes for such record from the dataspace and performing each of the first and second operations on the record using the retrieved attributes for such record to build the first and second disjoint results sets.

Turning now to the drawings, wherein like numbers denote like parts throughout the several views, FIG. 1 illustrates an exemplary hardware and software environment for an apparatus 10 suitable for performing queries in a manner consistent with the invention. For the purposes of the invention, apparatus 10 may represent practically any computer, computer system, or programmable device, e.g., multi-user or single-user computers, desktop computers, portable computers and devices, handheld devices, network devices, mobile phones, etc. Apparatus 10 will hereinafter be referred to as a "computer" although it should be appreciated that the term "apparatus" may also include other suitable programmable electronic devices.

Computer 10 typically includes at least one processor 12 coupled to a memory 14. Processor 12 may represent one or more processors (e.g. microprocessors), and memory 14 may represent the random access memory (RAM) devices comprising the main storage of computer 10, as well as any supplemental levels of memory, e.g., cache memories, non-volatile or backup memories (e.g. programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or another computer coupled to computer 10 via a network 18. The mass storage device 16 may contain a cache or other dataspace 20 which may include databases 22a and 22b.

Computer 10 also typically receives a number of inputs and outputs for communicating information externally. For interface with a user or operator, computer 10 typically includes one or more user input devices 24 (e.g., a keyboard, a mouse, a trackball, a joystick, a touchpad, a keypad, a stylus, and/or a microphone, among others). Computer 10 may also include a display 26 (e.g., a CRT monitor, an LCD display panel, and/or a speaker, among others). The interface to computer 10 may also be through an external terminal connected directly or remotely to computer 10, or through another computer communicating with computer 10 via a network 18, modem, or other type of communications device.

Computer 10 operates under the control of an operating system 28, and executes or otherwise relies upon various computer software applications, components, programs, objects, modules, data structures, etc. (e.g. query optimizer 30 and query engine 32). The query optimizer 30, for example, may optimize queries before they are performed by the query engine 32 on databases, such as the database 22a, 22b in the dataspace 20. Computer 10 communicates on the network 18 through a network interface 34.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Referring again to the example above and to the diagram in FIG. 2, the example SQL query:

SELECT jobid, dept, max(salary) FROM empinf GROUP BY GROUPING SETS(jobid,dept)

would likely be rewritten by a conventional query optimizer to a form similar to:

SELECT null( ),dept,max(salary) FROM empinf GROUP BY dept
UNION ALL
SELECT jobid,null( ),max(salary) FROM empinf GROUP BY jobid.

As noted above, the execution of this query would result in two passes through the empinf table and the generation of temporary result sets contributing to the overhead of this query. Two passes are necessary due to the disjoint nature of the result sets; each result set containing at least one attribute that is not common with the other result set and being processed by an operation that may or may not be compatible with the other operation. As seen in FIG. 2, two scans of a dataspace 40 containing the empinf table result in two sets of temporary result sets 42, 44. These temporary result sets 42, 44 may be cached or temporarily stored in some other manner. A hash scan 46, 48 is then performed on each of the respective temporary result sets 42,44, and the outputs of the hash scans 46, 48 are then unioned as shown at 50 to generate the required result set output 52. As described above, multiple passes through the dataspace and the storage of temporary results sets adds to the resources necessary to perform the query. These additional resources affect the capacity and response time of the database management system, which processes hundreds or even thousands of queries a second. Lower overhead requirements translate to better response time or additional capacity of the database management system.

In contrast, embodiments consistent with the invention may improve performance of queries such as that described above by making a single pass through the dataspace and iteratively processing applying multiple sub-queries to each record retrieved during the pass through the dataspace.

While other query optimizer and query engine architectures may be used in the alternative, one database management system capable of implementing the invention utilizes an object-oriented query execution data structure such as that illustrated in U.S. Pat. No. 6,915,291 to Carlson et al., the contents of which are incorporated by reference herein in their entirety. The aforementioned query execution data structure simplifies the definition of a Query Data Source (QDS) object, which contains N operations of which each can encapsulate a separate intermediate result set. In the above example, each operation includes an aggregating hash table. In the illustrated embodiment, the QDS object also contains a "query execution structure" that assists in implementing the "from", "where", and any other SQL clauses that identify input for a grouping/aggregation. For the above example, the query execution structure contains a scan over the dataspace (table empinf), with operations that set addressability to the required attributes. In this example, the attributes include columns from the empinf table: jobid, dept, and salary. Each operation is then constructed with a format that identifies the attributes that are relative to the operation. Again referring to the example above, one operation format is jobid and salary, with jobid as a key. The other operation format is dept and salary, with dept as the key.

Figure 4:
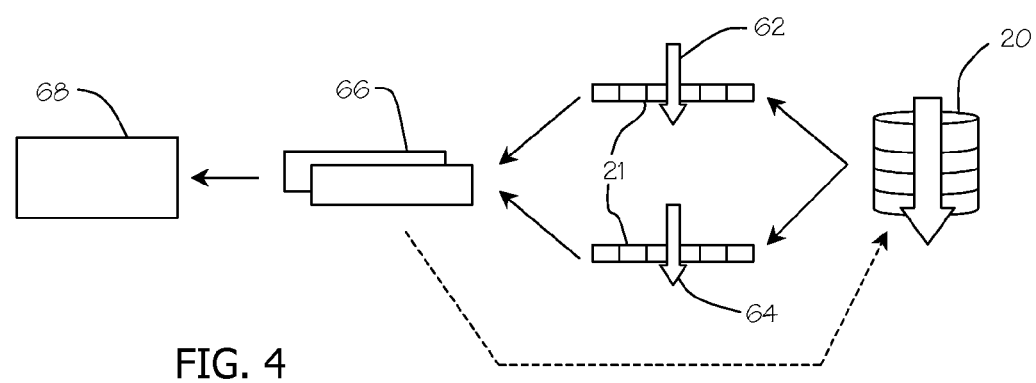
FIG. 4 is a block diagram showing another exemplary process of performing the database query of FIG. 2 in a manner consistent with the invention.

Given such a structure, the N operations may be initialized into empty sets. As seen in the diagrams in FIGS. 3 and 4, the source query on the dataspace 20 may then be positioned to the first record of the desired result set 21 and then each of the operations 62, 64 may be executed, e.g., the current attribute values located by the format may be grouped/aggregated by the operations 62, 64. These operations 62, 64 can be executed sequentially as shown in the diagram 60 in FIG. 3, or in parallel as shown in the diagram 70 in FIG. 4, as long as the source query execution structure position remains unchanged (or intermediate copies created, as desired).

After all operations have been executed, the source query is then position to the next record 21 in the result set, and the process continues until the result set is exhausted. Upon completion, the QDS object contains two different grouped/aggregated intermediate result sets that are unioned 66 together to form the complete result set 68. While the example for this embodiment employed two operations in the query, any number of operations may be employed in a number of sub-queries. As can be seen, this model not only eliminates the need to create intermediate temporary results set copies, and eliminates multiple scans of them, but also enables parallel operation execution. Furthermore, this model can be applied to other types of disjoint result sets from a single data source, e.g., hash table, sorted list, index, relative record number list, relative record number bitmap, unordered list, or any other type of sub-query result set, enabling performance savings in the implementation of other query types. Results sets can also be produced from an arbitrarily complex common sub-query, e.g., not limited to a single database table in the dataspace 20.

Figure 5:
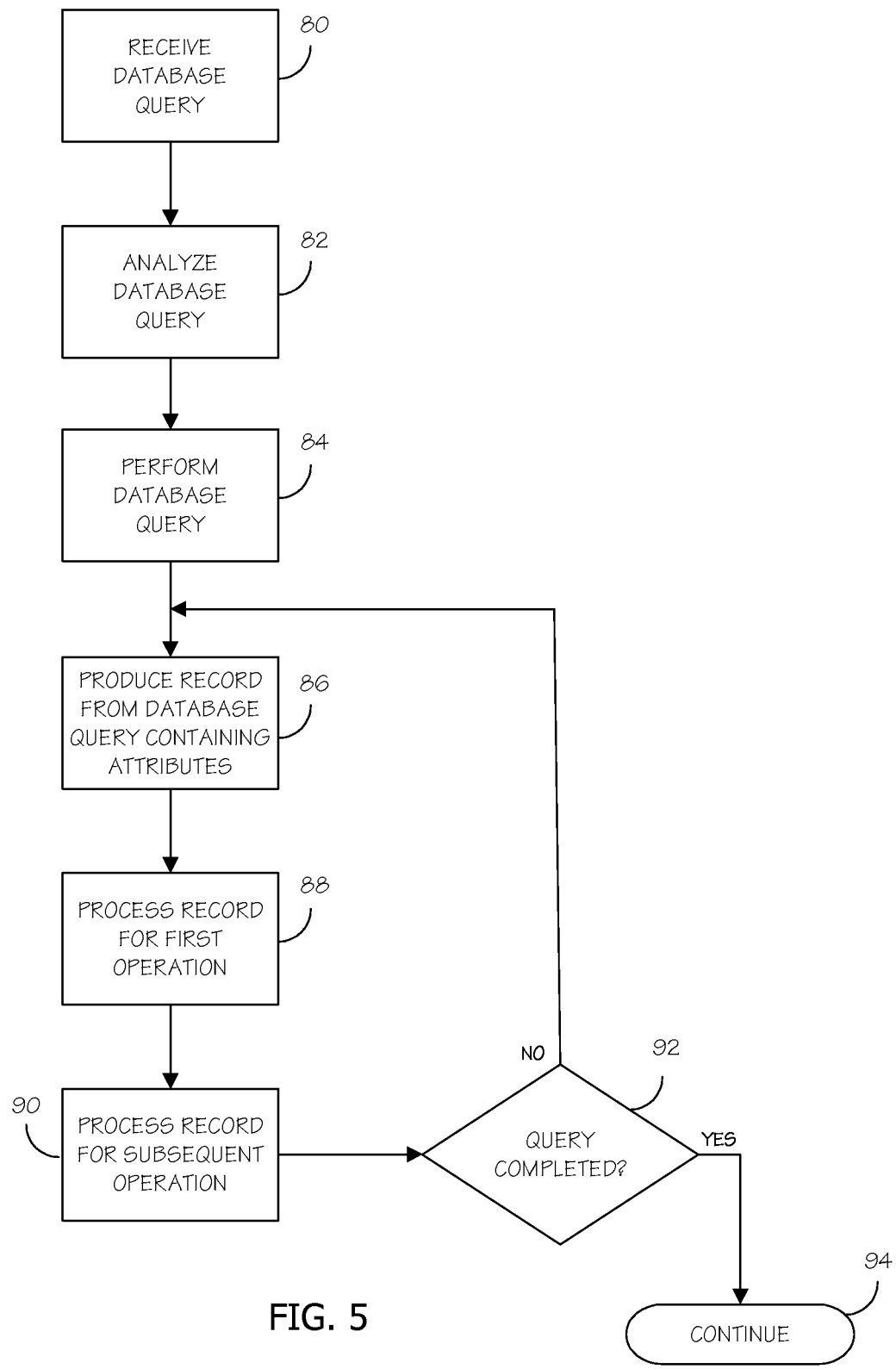
FIG. 5 is a flowchart showing a process capable of being executed by the computer of FIG. 1 to process database queries in a manner consistent with the invention.

FIG. 5 is a flowchart of a routine capable of being executed by computer 10 to implement the methods utilized above to produce a result set from multiple distinct intermediate result sets in a single pass of the dataspace. In this routine, a database query is received in block 80. The database query is analyzed, as discussed above, by, for example, a query optimizer in block 82. The query may include sub-queries that contain user-defined functions (UDF), user-defined table functions (UDTF), references to many tables, etc. The query optimizer determines the set of attributes from each of the operations in the query in preparation for executing the query. The query optimizer may scan through the query and identify each of the attributes necessary for each sub-query associated with a result set in order to prepare a query that retrieves all of the attributes in a single pass. In some embodiments, the query optimizer may create the list of attributes by performing a union of all retrieved attributes. After all of the attributes have been identified, the query is initialized and performed in block 84. The set of attributes for each output record from the result set of the query is produced in block 86 and processed by the first operation in block 88. Upon completion of processing by the first operation, the results output record is then processed by the next operation in block 90 until all operations have been executed against the result output record. While the operations are shown in this flowchart as being processed serially, other embodiments, such as the embodiment shown in the diagram 70 in FIG. 4 may process the operations in parallel. If there are further records to retrieve from the query ("NO" branch of decision block 92), then the next output results record is retrieved in block 86 and the process continues. If the there no further records to retrieve from the query ("YES" branch of decision block 92), then processing continues in block 94 of either further query operations or returning the results of the currently executed query.

Figure 6:
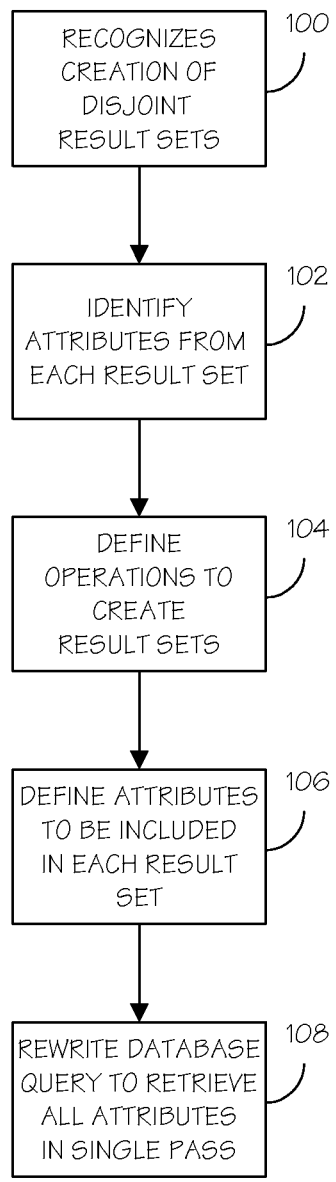
FIG. 6 is a flowchart showing an exemplary process for optimizing a query using the query optimizer referenced in FIG. 1.

In some embodiments, the query optimizer in block 82 of FIG. 5 may be responsible for recognizing the situations where a single pass of the dataspace can be exploited. As seen in the flowchart in FIG. 6, the query optimizer may recognize the creation of disjoint result sets in the query received by the optimizer in block 100. The optimizer then identifies all of the attributes associated with each of the disjoint result sets in block 102. Operations for each of the result sets are defined by the optimizer in block 104. The optimizer then defines the attributes that are included with each of the result sets for each operation and creates an empty result set, in some embodiments, for each operation in block 106. The optimizer then rewrites the database query to retrieve all of the attributes from all of the disjoint requested result sets in a single pass through the dataspace in block 108. Upon completion of the rewrite, the query is executed as shown in FIG. 5 and described above.

While all of the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the applicant's general inventive concept.

What is claimed is:

1. A method of performing a query of a database, the method comprising:
   receiving a database query, the database query including first and second operations respectively configured to generate first and second disjoint results sets from a dataspace;
   analyzing the database query to identify a set of attributes from the dataspace that are used by at least one of the first and second operations in the database query; and
   during execution of the database query, iteratively processing a plurality of records from the dataspace in a single pass, including, for each of the plurality of records, processing such record by retrieving the plurality of attributes for such record from the dataspace and performing each of the first and second operations on the record using the retrieved attributes for such record to build the first and second disjoint results sets.

2. The method of claim 1 wherein analyzing the database query comprises:

with a query optimizer, recognizing in the database query the creation of first and second disjoint results sets from the dataspace;

identifying the set of attributes from the dataspace that are used by at least one of the first and second operations in the database query;

defining the first and second operations to include in the set of attributes the attributes relevant to the corresponding first and second operations; and rewriting the database query with the query optimizer to retrieve all of the attributes in the set of attributes in a single pass through the common dataspace.

3. The method of claim 1 wherein the first and second operations each include a production of a hash table, sorted list, index, relative record number list, relative record number bitmap, or unordered list.

4. The method of claim 1 wherein performing each of the first and second operations on the record using the retrieved attributes for such record to build the first and second disjoint results sets is performed serially.

5. The method of claim 1 wherein performing each of the first and second operations on the record using the retrieved attributes for such record to build the first and second disjoint results sets is performed in parallel.

6. The method of claim 1 wherein the database query includes at least one of: user defined functions, user defined table functions, and references to many tables.

7. The method of claim 1 wherein each attribute in the set of attributes defines a column in a database table in the dataspace.

8. The method of claim 1 wherein the database query includes a third operation configured to generate a third disjoint results set from the dataspace, the method further comprising:

analyzing the database query to identify the set of attributes from the dataspace that are used by at least one of the first, second, and third operations in the database query; and during execution of the database query, iteratively processing a plurality of records from the dataspace in a single pass, including, for each of the plurality of records, processing such record by retrieving the plurality of attributes for such record from the dataspace and performing each of the first, second, and third operations on the record using the retrieved attributes for such record to build the first, second, and third disjoint results sets.

9. The method of claim 1 wherein the dataspace comprises a plurality of database tables including attributes referenced by the database query.

10. An apparatus comprising:

a processor; and program code configured to be executed by the processor for performing a query of a database, the program code configured to receive a database query, the database query including first and second operations respectively configured to generate first and second disjoint results sets from a dataspace, to analyze the database query to identify a set of attributes from the dataspace that are used by at least one of the first and second operations in the database query, and to iteratively process a plurality of records from the dataspace in a single pass during execution of the database query, including, for each of the plurality of records, processing such record by retrieving the plurality of attributes for such record from the dataspace and performing each of the first and second operations on the record using the retrieved attributes for such record to build the first and second disjoint results sets.

11. The apparatus of claim 10 wherein the program code is configured to analyze the database query by:

with a query optimizer, recognizing in the database query the creation of first and second disjoint results sets from the dataspace;

identifying the set of attributes from the dataspace that are used by at least one of the first and second operations in the database query;

defining the first and second operations to include in the set of attributes the attributes relevant to the corresponding first and second operations; and rewriting the database query with the query optimizer to retrieve all of the attributes in the set of attributes in a single pass through the common dataspace.

12. The apparatus of claim 10 wherein the first and second operations each include a production of a hash table, sorted list, index, relative record number list, relative record number bitmap, or unordered list.

13. The apparatus of claim 10 wherein the program code is configured to perform each of the first and second operations on the record using the retrieved attributes for such record to build the first and second disjoint results sets serially.

14. The apparatus of claim 10 wherein the program code is configured to perform each of the first and second operations on the record using the retrieved attributes for such record to build the first and second disjoint results sets in parallel.

15. The apparatus of claim 10 wherein the database query includes at least one of: user defined functions, user defined table functions, and references to many tables.

16. The apparatus of claim 10 wherein each attribute in the set of attributes defines a column in a database table in the dataspace.

17. The apparatus of claim 10 wherein the database query includes a third operation configured to generate a third disjoint results set from the dataspace, the program code further configured to analyze the database query to identify the set of attributes from the dataspace that are used by at least one of the first, second, and third operations in the database query, and to iteratively process a plurality of records from the dataspace in a single pass during execution of the database query, including, for each of the plurality of records, processing such record by retrieving the plurality of attributes for such record from the dataspace and performing each of the first, second, and third operations on the record using the retrieved attributes for such record to build the first, second, and third disjoint results sets.

18. A program product, comprising: a non-transitory recordable computer readable medium; and a program code configured for performing a query of a database, the program code resident on the computer readable medium and configured to receive a database query, the database query including first and second operations respectively configured to generate first and second disjoint results sets from a dataspace, to analyze the database query to identify a set of attributes from the dataspace that are used by at least one of the first and second operations in the database query, and to iteratively process a plurality of records from the dataspace in a single pass during execution of the database query, including, for each of the plurality of records, processing such record by retrieving the plurality of attributes for such record from the dataspace and performing each of the first and second operations on the record using the retrieved attributes for such record to build the first and second disjoint results sets.

19. The program product of claim 18 wherein the program code is configured to analyze the database query by:
- with a query optimizer, recognizing in the database query the creation of first and second disjoint results sets from the dataspace;
- identifying the set of attributes from the dataspace that are used by at least one of the first and second operations in the database query;
- defining the first and second operations to include the attributes in the set of attributes relevant to the corresponding first and second operations; and
- rewriting the database query with the query optimizer to retrieve all of the attributes in the set of attributes in a single pass through the common dataspace.

20. The program product of claim 18 wherein the first and second operations each include a production of a hash table, sorted list, index, relative record number list, relative record number bitmap, or unordered list.

21. The program product of claim 18 wherein the program code is configured to perform each of the first and second operations on the record using the retrieved attributes for such record to build the first and second disjoint results sets serially.

22. The program product of claim 18 wherein the program code is configured to perform each of the first and second operations on the record using the retrieved attributes for such record to build the first and second disjoint results sets in parallel.

23. The program product of claim 18 wherein the database query includes at least one of: user defined functions, user defined table functions, and references to many tables.

24. The program product of claim 18 wherein each attribute in the set of attributes defines a column in a database table in the dataspace.

25. The program product of claim 18 wherein the database query includes a third operation configured to generate a third disjoint results set from the dataspace, the program code further configured to analyze the database query to identify the set of attributes from the dataspace that are used by at least one of the first, second, and third operations in the database query, and to iteratively process a plurality of records from the dataspace in a single pass during execution of the database query, including, for each of the plurality of records, processing such record by retrieving the plurality of attributes for such record from the dataspace and performing each of the first, second, and third operations on the record using the retrieved attributes for such record to build the first, second, and third disjoint results sets.

* * * * *